United States Patent
Kim et al.

(10) Patent No.: US 10,534,466 B2
(45) Date of Patent: Jan. 14, 2020

(54) PRESSURE SENSOR, PRESSURE DETECTOR AND TOUCH INPUT DEVICE INCLUDING THE SAME

(71) Applicant: HiDeep Inc., Seongnam-si, Gyeonggi-do (KR)

(72) Inventors: Jongsik Kim, Gyeonggi-do (KR); Bonkee Kim, Gyeonggi-do (KR); Seyeob Kim, Gyeonggi-do (KR); Sunyoung Kwon, Gyeonggi-do (KR)

(73) Assignee: HIDEEP INC., Gyeonggi-do (KR)

( * ) Notice: Subject to any disclaimer, the term of this patent is extended or adjusted under 35 U.S.C. 154(b) by 0 days.

(21) Appl. No.: 15/150,864

(22) Filed: May 10, 2016

(65) Prior Publication Data
US 2016/0334914 A1  Nov. 17, 2016

(30) Foreign Application Priority Data
May 11, 2015 (KR) .................. 10-2015-0065513

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01)

(58) Field of Classification Search
CPC ........... G06F 2203/041; G06F 3/03547; G06F 3/041; G06F 3/0412; G06F 3/0414; G06F 3/0416; G06F 3/0418; G06F 3/046; G06F 3/047; G06F 3/044; H05K 9/0073; H05K 9/0079; H05K 9/0081; H05K 9/0088; G01L 1/144
See application file for complete search history.

(56) References Cited

U.S. PATENT DOCUMENTS 5,445,031 A * 8/1995 Benzel .................. G01L 9/0072
361/281
5,770,802 A   6/1998 Berthold et al.
6,145,384 A * 11/2000 Ikeda ................... G01D 5/2417
73/780
(Continued)

FOREIGN PATENT DOCUMENTS

CN    101957510 A    1/2011
JP    H10-300776 A   11/1998
(Continued)

OTHER PUBLICATIONS

Extended European Search Report dated Sep. 28, 2016 in related European Appl. 16168989.8 (6 pgs.).
(Continued)

*Primary Examiner* — Grant Sitta
(74) *Attorney, Agent, or Firm* — Foley & Lardner LLP

(57) ABSTRACT

A pressure sensor may be provided that includes: an electrode; a drive unit which applies a drive signal to the electrode; a sensing unit which receives, through the electrode, a reception signal including information on a capacitance which is between the electrode and a reference potential layer and is changed according to a relative distance between the electrode and the reference potential layer spaced from the electrode; and a first impedance between the drive unit and the electrode, and a second impedance between the sensing unit and the electrode.

15 Claims, 6 Drawing Sheets

(56) References Cited

U.S. PATENT DOCUMENTS

| | | | | |
|---|---|---|---|---|
| 6,564,643 | B1* | 5/2003 | Horie | G01L 9/0073 361/283.4 |
| 7,378,856 | B2 | 5/2008 | Peine et al. | |
| 8,089,289 | B1* | 1/2012 | Kremin | G01D 5/24 324/658 |
| 8,094,133 | B2* | 1/2012 | Sato | G06F 3/044 345/173 |
| 9,001,066 | B2* | 4/2015 | Mohindra | G06F 3/0416 345/173 |
| 9,645,029 | B2* | 5/2017 | Hammerschmidt | G01L 1/144 |
| 9,711,570 | B1* | 7/2017 | Lee | H01L 27/323 |
| 2005/0218911 | A1* | 10/2005 | Denison | G01D 5/2417 324/661 |
| 2006/0027739 | A1* | 2/2006 | Warren | B82Y 35/00 250/234 |
| 2008/0252303 | A1* | 10/2008 | Kato | H03K 17/955 324/661 |
| 2010/0024573 | A1 | 2/2010 | Daverman et al. | |
| 2010/0219842 | A1 | 9/2010 | Gianetti | |
| 2011/0001492 | A1* | 1/2011 | Nys | H03M 1/123 324/658 |
| 2011/0248723 | A1* | 10/2011 | Yeh | G01D 5/24 324/601 |
| 2011/0254571 | A1* | 10/2011 | Togura | G01D 5/24 324/679 |
| 2012/0162123 | A1* | 6/2012 | Kent | G06F 3/0418 345/174 |
| 2012/0326734 | A1* | 12/2012 | Cho | G06F 3/0416 324/684 |
| 2013/0076648 | A1* | 3/2013 | Krah | G06F 3/0412 345/173 |
| 2013/0234977 | A1* | 9/2013 | Lin | G06F 3/044 345/174 |
| 2014/0132529 | A1* | 5/2014 | Jeong, II | G06F 3/044 345/173 |
| 2014/0260647 | A1* | 9/2014 | Shaeffer | G01L 9/12 73/724 |
| 2015/0035790 | A1* | 2/2015 | Mo | G06F 3/044 345/174 |
| 2015/0062068 | A1* | 3/2015 | Shih | G06F 3/044 345/174 |
| 2015/0123940 | A1* | 5/2015 | Park | G06F 3/0416 345/174 |
| 2015/0160778 | A1* | 6/2015 | Kim | G06F 3/044 345/174 |
| 2016/0179276 | A1* | 6/2016 | Nathan | G06F 3/0414 345/174 |
| 2016/0263157 | A1* | 9/2016 | Day | A61K 35/19 |
| 2016/0364045 | A1* | 12/2016 | Lo | G06F 3/016 |
| 2017/0255293 | A1* | 9/2017 | Sundara-Rajan | G06F 3/0414 |
| 2017/0300157 | A1* | 10/2017 | Lu | G06F 3/0414 |
| 2018/0138247 | A1* | 5/2018 | Lee | H01L 27/323 |

FOREIGN PATENT DOCUMENTS

| | | | |
|---|---|---|---|
| JP | 2005-057083 A | 3/2005 | |
| JP | 2005-164448 A | 6/2005 | |
| JP | WO 2005054802 A1 * | 6/2005 | G01L 1/142 |
| KR | 10-2010-0025176 | 3/2010 | |
| KR | 10-2011-0022727 | 3/2011 | |
| WO | WO 2005/054802 A1 | 6/2005 | |
| WO | WO 2005/101030 A1 | 10/2005 | |
| WO | WO 2010/024495 A1 | 3/2010 | |

OTHER PUBLICATIONS

Office Action dated May 30, 2016 in related Korean Appl. 10-2015-0065513 (5 pgs.).

Office Action dated Feb. 14, 2017 in related Japanese Appl. 2016-094965 (2 pgs.).

Office Action dated Jun. 20, 2017 in related Japanese Appl. 2016-094965 (3 pgs.).

Office Action dated Jul. 2, 2018 in related Chinese Appl. 201510802187.1 (7 pgs.).

* cited by examiner

【Fig. 1】
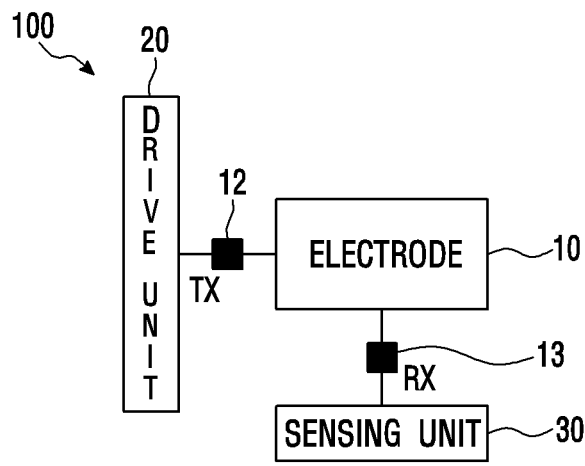
【Fig. 2】
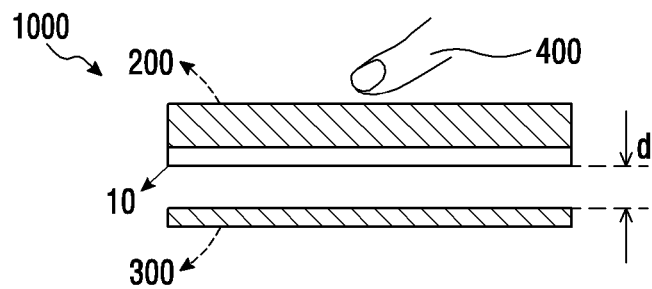
【Fig. 3】
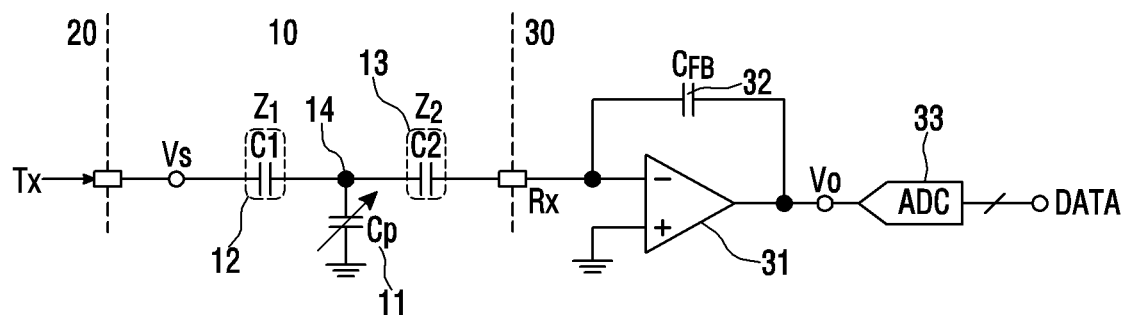

[Fig. 4]
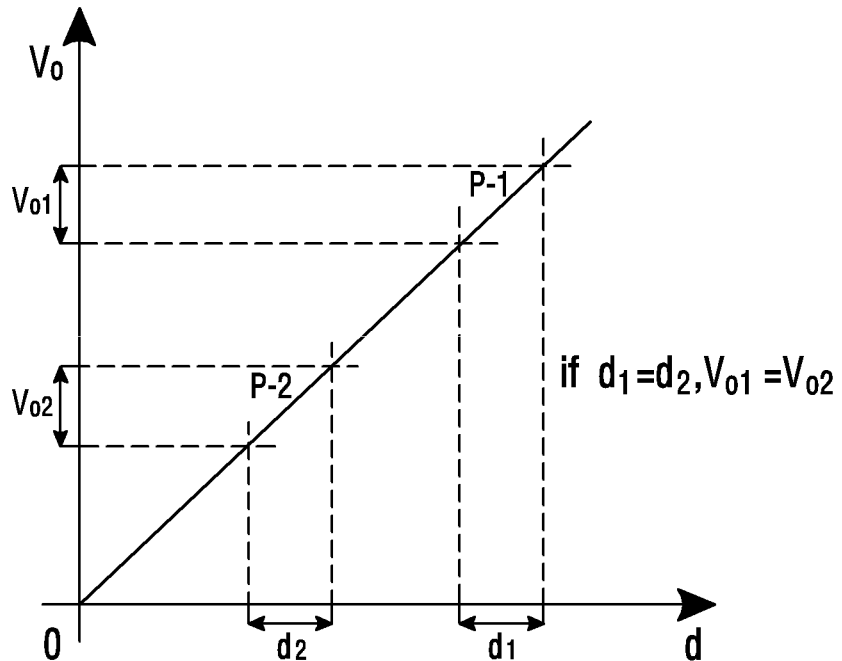
[Fig. 5]
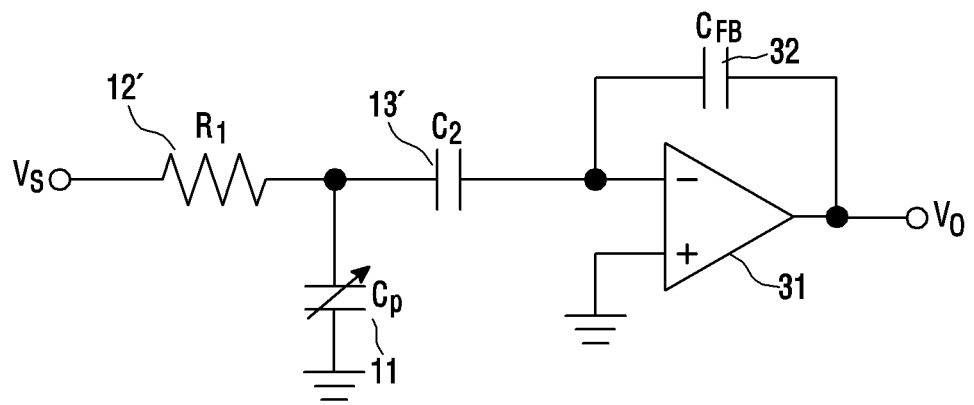

[Fig. 6]
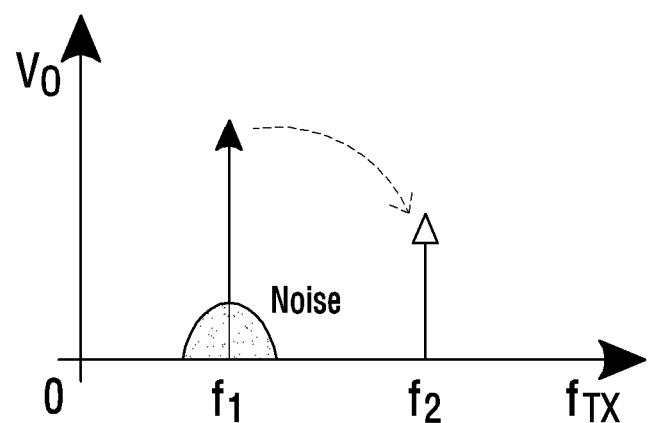
[Fig. 7a]
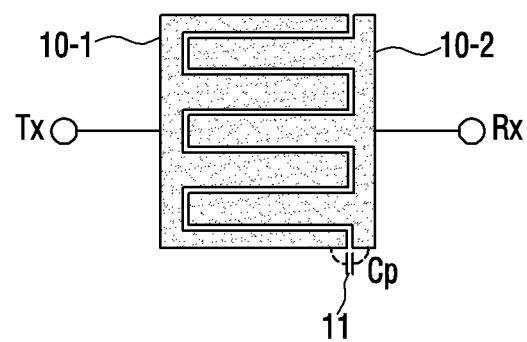

[Fig. 7b]
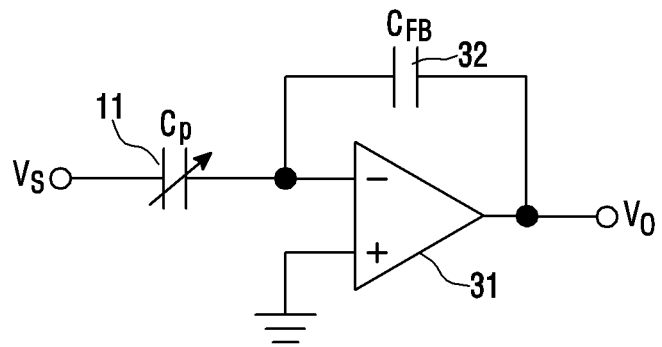
[Fig. 7c]
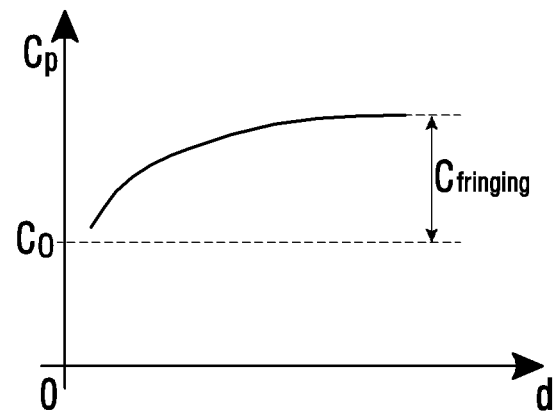
[Fig. 7d]
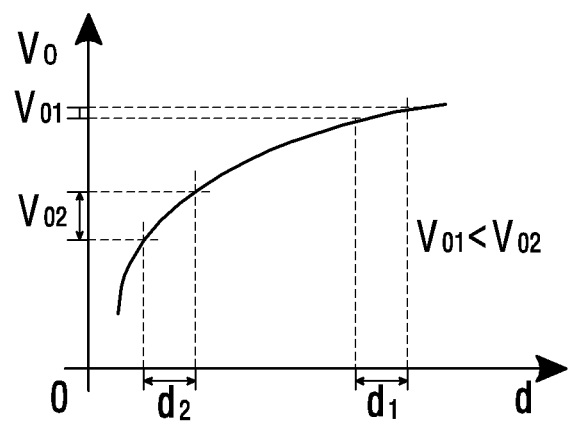

【Fig. 8a】
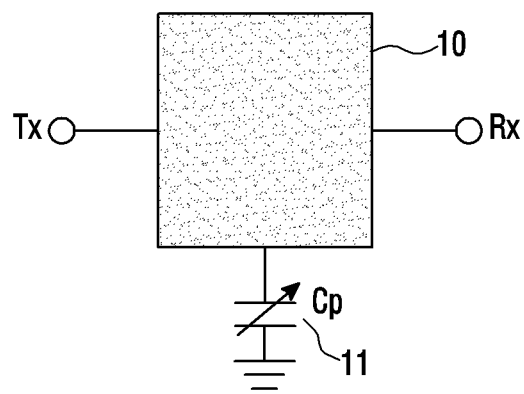
【Fig. 8b】
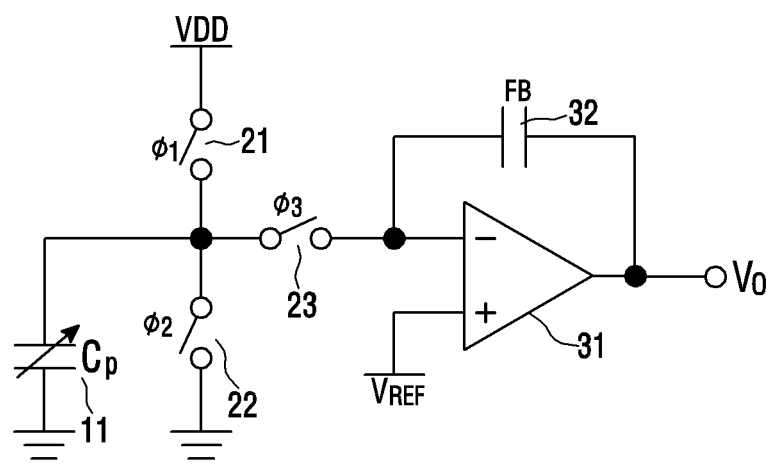

【Fig. 8c】
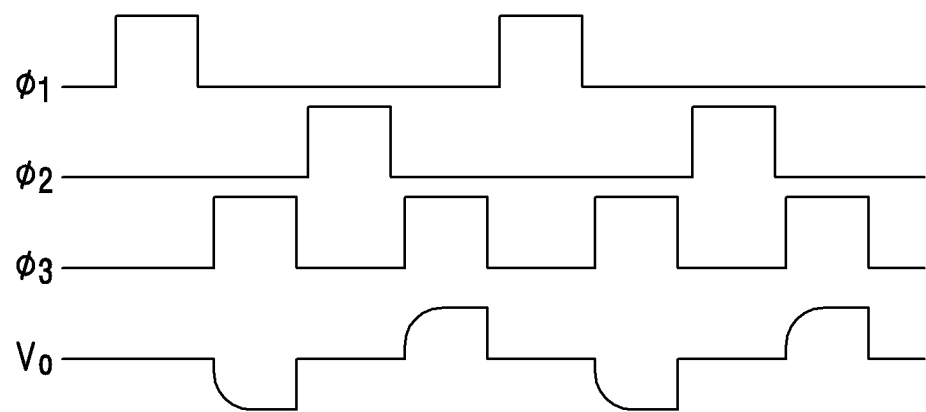
【Fig. 8d】
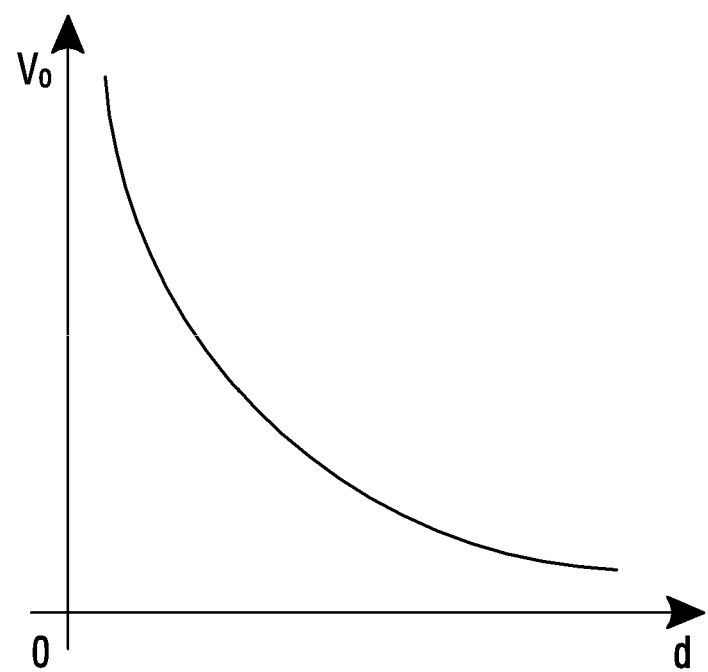

PRESSURE SENSOR, PRESSURE DETECTOR AND TOUCH INPUT DEVICE INCLUDING THE SAME

BACKGROUND

Field

This disclosure relates to a pressure sensor, a pressure detector and a device including the same, and more particularly to a pressure sensor, a pressure detector and a device including the same, which are able to provide a signal linearly changing according to a magnitude of the pressure.

Description of the Related Art

Various kinds of input devices are being used to operate a computing system. For example, the input device includes a button, key, joystick and touch screen. Since the touch screen is easy and simple to operate, the touch screen is increasingly being used in operation of the computing system.

The touch screen may include a touch sensor panel which may be a transparent panel including a touch-sensitive surface. The touch sensor panel is attached to the front side of a display screen, and then the touch-sensitive surface may cover the visible side of the display screen. The touch screen allows a user to operate the computing system by simply touching the display screen by a finger, etc. In general, the touch screen recognizes the touch and the touch position on the display screen, and the computing system analyzes the touch, and thus, performs operations in accordance with the analysis.

In addition to this, research is being conducted to detect not only the position of the touch and but also the pressure of the touch on the touch surface of a touch input device. Here, a pressure sensor may be manufactured independently of the applied touch input device, etc., and it is necessary to correct a pressure detection circuit for each application applied to detect the uniform magnitude of the pressure. This is because a distance, etc., between a pressure electrode and a reference potential layer is changed for each applied application. Therefore, there is a requirement for a pressure detection method capable of simply detecting the magnitude of the pressure without correction irrespective of the applied application.

SUMMARY

One embodiment is a pressure sensor that includes: an electrode; a drive unit which applies a drive signal to the electrode; a sensing unit which receives, through the electrode, a reception signal including information on a capacitance which is between the electrode and a reference potential layer and is changed according to a relative distance between the electrode and the reference potential layer spaced from the electrode; and a first impedance between the drive unit and the electrode, and a second impedance between the sensing unit and the electrode.

Another embodiment is a pressure detector that includes: a drive unit which applies a drive signal to an electrode; and a sensing unit which receives, through the electrode, a reception signal including information on a capacitance which is between the electrode and a reference potential layer and is changed according to a relative distance between the electrode and the reference potential layer spaced from the electrode. The drive signal passes through a first impedance between the drive unit and the electrode and then is applied to the electrode, and the reception signal passes through a second impedance between the sensing unit and the electrode and then is received in the sensing unit.

Further another embodiment is a touch input device that includes the reference potential layer and the pressure sensor.

BRIEF DESCRIPTION OF THE DRAWINGS

FIG. 1 is a structure view of a pressure sensor according to an embodiment;

FIG. 2 is a cross sectional view of a device to which the pressure sensor has been applied according to the embodiment;

FIG. 3 shows an equivalent circuit of a pressure sensor according to a first example;

FIG. 4 is a graph showing an output signal of a pressure detector, which is based on a change of a distance between an electrode and a reference potential layer of the pressure sensor according to the embodiment;

FIG. 5 shows an equivalent circuit of a pressure sensor according to a second example;

FIG. 6 shows a frequency variation of a drive signal, which is not suitable to be applied to the second example;

FIGS. 7a to 7d show, in a case where a signal which is non-linearly changed according to a distance change between an electrode and a reference potential layer is outputted in accordance with a third example, a structure of the electrode, an equivalent circuit, a graph showing a pressure capacitance change according to the distance change, and a graph showing a change of the output signal according to the distance change, respectively; and FIGS. 8a to 8d show, in a case where a signal which is non-linearly changed according to a distance change between an electrode and a reference potential layer is outputted in accordance with a fourth example, a structure of the electrode, an equivalent circuit, a timing diagram for detecting a pressure capacitance, and a graph showing a change of the output signal according to the distance change, respectively.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, a pressure sensor 100 will be described according to an embodiment of the present invention.

FIG. 1 is a structure view of the pressure sensor 100 according to the embodiment. Referring to FIG. 1, the pressure sensor 100 according to the embodiment may include an electrode 10, a drive unit 20 which applies a drive signal to the electrode 10, and a sensing unit 30 which receives a signal including information on a capacitance from the electrode 10 and then detects information on a touch pressure.

In the pressure sensor 100 according to the embodiment, the drive unit 20 applies a drive signal to the electrode 10, and the sensing unit 30 measures a capacitance between the electrode 10 and a reference potential layer 300 through the electrode 10, thereby detecting the magnitude of the pressure. The drive unit 20 may include, for example, a clock generator (not shown) and a buffer (not shown), generate a drive signal in the form of a pulse and applies to the electrode 10. This is just an example. The drive unit 20 may be implemented by means of various elements, and the shape of the drive signal may be variously changed.

According to the embodiment, the drive unit 20 and the sensing unit 30 may be implemented by an integrated circuit and may be formed on one chip. The drive unit 20 and the sensing unit 30 may constitute a pressure detector.

The electrode 10 according to the embodiment may be made of a transparent conductive material (for example, indium tin oxide (ITO) or antimony tin oxide (ATO) which is made of tin oxide ($SnO_2$), and indium oxide ($In_2O_3$), etc.), or the like. The electrode 10 according to the embodiment may be also made of a transparent conductive material or an opaque conductive material. For instance, the electrode 10 may be formed to include at least any one of silver ink, copper, nano silver, and carbon nanotube (CNT).

The electrode 10 may be formed such that there is a large facing surface between the electrode 10 and the reference potential layer 300 in order that a capacitance change amount is easily detected between the electrode 10 and the reference potential layer 300. For example, the facing surface may be, as shown in FIG. 8a, formed in a plate-like pattern.

Hereinafter, it is described as an example that the pressure sensor 100 detects the magnitude of the pressure from one electrode 10. However, according to the embodiment, the pressure sensor 100 can be configured to be able to detect the magnitude of multi pressure according to a multi touch by constituting a plurality of channels with the inclusion of a plurality of the electrodes 10.

The capacitance between the electrode 10 and the reference potential layer changes according to a distance change between the electrode 10 and the reference potential layer 300 in accordance with the embodiment of the present invention. The sensing unit 30 is caused to detect information on such a capacitance change, so that it is possible to detect the magnitude of the pressure through the pressure sensor 100 according to the embodiment of the present invention. The pressure sensor 100 according to the embodiment of the present invention is able to detect the magnitude of the pressure on the basis of the self-capacitance of the electrode 10.

FIG. 2 is a cross sectional view of a device 1000 to which the pressure sensor 100 has been applied according to the embodiment. FIG. 2 shows a simplified physical structure for detecting the pressure through the pressure sensor 100 according to the embodiment. The pressure sensor 100 according to the embodiment may be applied to the device 1000 including the reference potential layer 300 and detect the magnitude of the pressure which is applied to the device 1000. For example, the electrode 10 may be disposed separately from the reference potential layer 300 at a little distance "d". Here, a material which is deformable by the application of the pressure through an object 400 may be disposed between the electrode 10 and the reference potential layer 300. For instance, the deformable material disposed between the electrode 10 and the reference potential layer 300 may be air, dielectrics, an elastic body and/or a shock absorbing material.

When the object 400 presses a configuration 200 forming a touch surface, a distance between the electrode 10 and the reference potential layer 300 is decreased in accordance with the magnitude of the pressure. The reference potential layer 300 may be any potential layer included in the device 1000. In the embodiment, the reference potential layer may be a ground layer having a ground potential. As the distance "d" becomes smaller, a capacitance of a capacitor Cp, which is formed between the electrode 10 and the reference potential layer 300, may be increased. That is, the self-capacitance of the electrode 10 with respect to the reference potential layer 300 may be increased with the decrease of the distance "d".

The device 1000 to which the pressure sensor 100 according to the embodiment can be applied may be a touch input device 1000 including a touch sensor panel and/or a display panel, which are used to detect a touch position. The electrode 10 of the pressure sensor 100 according to the embodiment may be disposed at any position within the touch input device 1000. For example, in FIG. 2, the electrode 10 may be disposed under the display panel 200. Here, the reference potential layer 300 may be a noise shielding layer of the display panel 200. Or, the reference potential layer 300 may be a shielding layer for shielding noise generated from a central processing unit (CPU) or an application processor (AP), etc., which are positioned on a main board and is provided for the operation of the touch input device 1000. Here, the reference potential layer 300 may be a mid-frame which distinguishes between and supports the display panel 200 and the main board in the touch input device 1000.

FIG. 2 shows that the electrode 10 is disposed under the display panel 200. This is just an example. The electrode 10 may be disposed at any position spaced at a predetermined distance from the reference potential layer 300 within the touch input device 1000. Also, in the touch input device 1000, it is shown that the top surface of the display panel 200 constitutes the touch surface. This is just an example. The touch surface may have any other configuration, and it is enough as long as the distance between the electrode 10 and the reference potential layer 300 can change depending on the application of the pressure to the touch surface.

Referring to FIG. 1, the pressure sensor 100 according to the embodiment of the present invention further includes a first impedance 12 (Z1) between the drive unit 20 and the electrode 10 and a second impedance 13 (Z2) between the sensing unit 30 and the electrode 10. The first impedance 12 and the second impedance 13 will be described below in detail.

FIG. 3 shows an equivalent circuit of the pressure sensor 100 according to a first example. FIG. 3 shows an equivalent circuit of the areas of the electrode 10 and the sensing unit 30 of the pressure sensor 100.

"Vs" is a drive signal which is applied to the electrode 10. For example, "Vs" may be a time-dependent voltage signal as a drive signal which is applied to the electrode 10. For example, the drive signal Vs may be applied in the form of a series of pulses.

A pressure capacitor 11 (Cp) is located between a drive stage Tx for the drive unit 20 to apply the drive signal Vs to the electrode 10 and a receiving stage Rx for the sensing unit 30 to detect a reception signal from the electrode 10. The pressure capacitor 11 may be shown to be located between a connector 14 and the ground, i.e., the reference potential layer 300. Here, since the capacitance of the pressure capacitor 11 changes depending on the distance between the electrode 10 and the reference potential layer 300, the pressure capacitor 11 can be indicated to be variable.

In order to detect the pressure through the pressure capacitor 11 of the pressure sensor 100 according to the embodiment of the present invention, the electrode 10 may be configured between the first impedance 12 and the second impedance 13. FIG. 3 shows that both the first impedance 12 and the second impedance 13 are pure capacitors C1 and C2. As shown in FIG. 3, both the first impedance 12 and the second impedance 13 are configured with the capacitors, thereby providing a performance that the pressure sensor 100 does not depend on an operating frequency of the drive signal Vs.

In FIGS. 1 and 3, it can be construed that the first impedance 12 and the second impedance 13 are formed between the drive unit 20 and the electrode 10 and between the sensing unit 30 and the electrode 10, respectively, and are formed at the outside of a chip where the pressure detector has been integrated. For instance, the first impedance 12 and the second impedance 13 may be formed at the outside of the chip and formed on a conductive trace, etc., which connects the chip and the electrode. Here, the first impedance 12 and the second impedance 13 may be configured very close to the chip. However, this is just an example of the configuration, and it is possible that one or both of the first impedance 12 and the second impedance 13 are integrated on the chip where the pressure detector has been integrated. The first impedance 12 and the second impedance 13 are implemented within the chip, so that additional external devices are not required and manufacturing cost can be reduced. Also, the first impedance 12 and the second impedance 13 are connected to an electrode for detecting any pressure, thereby providing a uniform pressure detection performance.

In FIG. 3, the sensing unit 30 according to the embodiment may include a capacitance sensor including an amplifier 31 and a feedback capacitor 32. The feedback capacitor 32 is connected between the negative input terminal of the amplifier 31 and the output terminal of the amplifier 31, in other words, connected to a feedback path thereof. Here, the positive input terminal of the amplifier may be connected to the ground or a reference potential Vref. Also, the capacitance sensor may further include a reset switch (not shown) which is connected in parallel to the feedback capacitor 32. The reset switch may reset the conversion from current to voltage, which is performed by the capacitance sensor. The negative input terminal of the amplifier 31 receives a current signal including information on the capacitance of the pressure capacitor 11 from the electrode 10 through receiving stage Rx and integrates, and then converts the current signal into a voltage signal Vo. The sensing unit 30 may further include an analog to digital converter (ADC) which can convert the analog data signal Vo which has passed through the capacitance sensor into a digital data. In the future, the digital data may be inputted to a processor, etc., such as AP, CPU, or the like, and be processed to obtain the magnitude of the touch pressure. The sensing unit 30 according to the embodiment may further include a processor.

Referring back to FIG. 2, when a pressure is applied by the object 400 and the distance "d" between the electrode 10 and the reference potential layer 300 is reduced, the capacitance of the pressure capacitor 11 is increased. A relationship between the output signal Vo of the capacitance sensor and the drive signal Vs may be represented by the following equation (1) with reference to the equivalent circuit of FIG. 3.

$$v_o = -\left(\frac{C_1}{C_1 + C_2 + C_p}\right) \cdot \frac{C_2}{C_{FB}} \cdot v_s \qquad \text{equation (1)}$$

Referring to the equation (1), it can be understood that the output signal Vo has nothing to do with the frequency of the drive signal Vs. Here, when it is assumed that Cp>>C1+C2, the equation (1) can be simplified as the following equation (2).

$$v_o = -\frac{C_1}{C_p} \cdot \frac{C_2}{C_{FB}} \cdot v_s \qquad \text{equation (2)}$$

$$v_o = -\frac{C_1 C_2}{\varepsilon A C_{FB}} \cdot d \cdot v_s$$

Here, Cp can be represented as $$C_p = \varepsilon \frac{A}{d}.$$

Here, "ε" represents a dielectric constant $\varepsilon_0 \varepsilon_r$ of a material filled between the electrode 10 and the reference potential layer 300, "A" represents the surface of the electrode 10, and "d" represents the distance between the electrode 10 and the reference potential layer 300. In the equation (2), it can be seen that the output signal Vo changes linearly in proportion to the distance "d". It is apparent that the capacitances of Cp, C1 and C2 can change according to the embodiment/environment. A linear relationship between the output signal Vo and the distance "d" could be obtained by the result obtained by applying the capacitance of Cp in a range of hundreds of pico Farads (pF) and the capacitances of C1 and C2 in a range of several tens of pico Farads (pF).

FIG. 4 is a graph showing the output signal of the pressure detector, which is based on the change of the distance between the electrode and the reference potential layer of the pressure sensor according to the embodiment. The graph of FIG. 4 is obtained by removing offset or the like. Referring to FIG. 4, as long as the change amounts of the distance "d" by the pressure are the same each other even when a deviation occurs in the absolute value of the capacitance of the pressure capacitor 11, it is discovered that the subsequent change amount of the output signal Vo can be constantly maintained. For example, the distance "d" between the electrode 10 and the reference potential layer 300 may be changed depending on a first application P-1 and a second application P-2 to which the pressure sensor 100 is applied. However, in a case where the pressure sensor 100 according to the embodiment is used, if the change amounts of the distance "d" between the electrode 10 and the reference potential layer 300 are the same as each other according to the applied pressure (d1=d2), the change amount of the output signal Vo can be maintained the same (Vo1=Vo2).

FIG. 5 shows an equivalent circuit of a pressure sensor according to a second example. FIG. 5 shows an equivalent circuit between the drive signal Vs and the output signal Vo when a resistor R1 is used as the first impedance. The description of FIG. 5 is the same as that of FIG. 3 with the exception of the fact that the resistor R1 is used as the first impedance, and repetitive descriptions thereof will be omitted.

In the pressure sensor 100 of FIG. 5, a transfer function between the drive signal Vs and the output signal Vo can be represented by the following equation (3).

$$v_o = -\left\{\frac{1/j\omega(C_2+C_p)}{R_1+1/j\omega(C_2+C_p)}\right\} \cdot \frac{C_2}{C_{FB}} \cdot v_s \quad \text{equation (3)}$$

Here, when it is assumed that Cp>>C2, the equation (3) can be simplified as the following equation (4).

$$v_o = -\left(\frac{1}{1+j\omega C_p R_1}\right) \cdot \frac{C_2}{C_{FB}} \cdot v_s \quad \text{equation (4)}$$

Here, ω=2πf and "f" is a frequency of the drive signal Vs. As can be seen from the equation (4), the magnitude of the output signal Vo is reduced with the increase of the frequency of the drive signal Vs.

Here, according to the equation (4), even though the linear relationship is not completely formed between the output signal Vo and the distance "d", an almost linear characteristic is formed between the output signal Vo and the distance "d" at a fixed frequency. Therefore, in the entire system according to the embodiment, as with the first example, the signal processing can be simplified. While in the foregoing description, the example has been provided in which the first impedance 12 is a resistive component and the second impedance 13 is a capacitive component, it can be also considered that the first impedance 12 is a capacitive component and the second impedance 13 is a resistive component.

As described with reference to FIG. 5, when at least any one of the first impedance 12 and the second impedance 13 of the pressure sensor 100 is a resistive component instead of a pure capacitor, the output signal of which the characteristic is changed according to the frequency of the drive signal Vs is obtained.

It is apparent that the capacitances of Cp and C2 are changed according to the embodiment/environment. A linear relationship between the output signal Vo and the distance "d" and the characteristics that are changed according to the frequency could be obtained by the result obtained by applying the capacitance of Cp in a range of hundreds of pico Farads (pF) and the capacitance of C2 in a range of several tens of pico Farads (pF).

The above configuration of the pressure sensor 100 having the characteristics that are changed according to the frequency may not be suitable for some applications. FIG. 6 shows a frequency variation of the drive signal, which is not suitable to be applied to the second example. For example, as shown in FIG. 6, in a case where the pressure sensor 100 operates at a frequency of f1, if a noise signal in a band similar to that of the frequency of f1 is inputted, a signal to noise ratio (SNR) of the pressure sensor 100 may be reduced. In order to avoid the noise in this condition, it is required to change the driving frequency of the drive signal Vs. For example, if the driving frequency of the drive signal Vs is changed into f2, the magnitude of the output signal Vo is reduced as can be seen from the equation (4).

For instance, the circuit configuration, shown in FIG. 5, in which at least any one of the first impedance 12 and the second impedance 13 is substituted with a resistive component may not be suitable for an application that should dynamically change the driving frequency of the drive signal Vs.

Hereinafter, described will be a case where the pressure sensor 100 according to the embodiment does not include the first impedance 12 and the second impedance 13.

FIGS. 7a to 7d show, in a case where an output signal which is non-linearly changed according to a distance change between an electrode and a reference potential layer is outputted in accordance with a third example, a structure of the electrode, an equivalent circuit, a graph showing a pressure capacitance change according to the distance change, and a graph showing a change of the output signal according to the distance change, respectively.

FIG. 7 shows that the pressure is detected without including the first impedance 12 and the second impedance 13.

As shown in FIG. 7a, the electrode 10 is composed of a first electrode 10-1 and a second electrode 10-2, and the pressure can be detected on the basis of the change of the capacitance between the first electrode 10-1 and the second electrode 10-2. Like the electrode 10 of FIG. 2, the first electrode 10-1 and the second electrode 10-2 shown in FIG. 7a may be, for example, disposed apart from the reference potential layer 300 by a predetermined distance. When a pressure is applied by the object 400, the distance between the reference potential layer 300 and the first and second electrodes 10-1 and 10-2 is reduced. Here, since an electric field generated between the first electrode 10-1 and the second electrode 10-2 is absorbed in the reference potential layer 300, the magnitude of the capacitance of the pressure capacitor 11 between the first electrode 10-1 and the second electrode 10-2 is reduced.

FIG. 7b shows an equivalent circuit in which the pressure capacitor 11 shown in FIG. 7a between the first electrode 10-1 and the second electrode 10-2 is connected in series between the drive stage and the sensing unit. Here, a relational expression between the drive signal Vs and the output signal Vo may be represented by the following equation (5).

$$v_o = -\frac{C_p}{C_{FB}} \cdot v_s \quad \text{equation (5)}$$

Here, a capacitance lost to the reference potential layer 300 among the capacitance between the first electrode 10-1 and the second electrode 10-2 is a fringing capacitance. Here, the capacitance of the pressure capacitor 11 may be represented by the following equation (6).

$$C_p = C_o + C_{fringing} = C_o + \alpha d \quad \text{equation (6)}$$

Here, Co represents a fixed capacitance formed between the first electrode 10-1 and the second electrode 10-2, and $C_{fringing}$ represents a capacitance formed by fringing effect between the first electrode 10-1 and the second electrode 10-2. The fixed capacitance means a capacitance formed by the first electrode 10-1 and the second electrode 10-2, regardless of the distance between the reference potential layer 300 and the electrode. The circuit of FIG. 7c has a structure in which a fringing field formed between the first electrode 10-1 and the second electrode 10-2 is more lost to the reference potential layer 300 the closer the electrode 10 is to the reference potential layer 300. Therefore, the value of $C_{fringing}$ is increased with the increase of the distance "d". The equation (6) represents the value of $C_{fringing}$ by means of the distance "d" and a coefficient "a". As can be seen from the equation (5) and equation (6), since the magnitude of the output signal Vo has no linear relationship with the distance "d", the change amounts of the output voltage are not the same (Vo1<Vo2) even when the change amounts of the distance "d" are the same (d1=d2).

This phenomenon causes a signal processing of the pressure sensor to be complicated. Since the magnitude of the pressure for the change amount of the distance "d" may be analyzed differently depending on applications, numerical analysis is required to be modified and applied to each application. Also, the pressure detection performance of the above-structured pressure sensor 100 is significantly affected by the deviation of the absolute value of the pressure capacitor 11, which occurs during the manufacturing process thereof. In this case, for example, it may be required to control gains by controlling a power voltage (e.g., VDD of FIG. 8b) and/or by controlling the value of the feedback capacitor $C_{FB}$ for each application, and/or a separate calibration may be required in the signal processing. Further, for the purpose of obtaining the output signal Vo with an appropriate magnitude, there may be, for example, a restriction that the pressure capacitor 11 should have a small value similar to that of the feedback capacitor 32 ($C_{FB}$).

FIGS. 8a to 8d show, in a case where the voltage signal which is non-linearly changed according to a distance change between an electrode and a reference potential layer is outputted in accordance with a fourth example, a structure of the electrode, an equivalent circuit, a timing diagram for detecting a pressure capacitance, and a graph showing a change of the output signal according to the distance change, respectively.

FIG. 8 shows another case where the pressure is detected without including the first impedance 12 and the second impedance 13.

FIG. 8a shows the electrode 10 which can be used to detect the pressure in the fourth example. The electrode 10 shown in FIG. 8a may be, for example, the same as the electrode 10 which is used in the pressure sensor 100 according to the embodiment. As shown in FIG. 2, the electrode 10 may be disposed apart from the reference potential layer 300 by a predetermined distance. Here, the capacitance between the electrode 10 and the reference potential layer 300 may be used as the value of the pressure capacitor 11.

In FIG. 8, a separate drive signal Vs is not applied by the drive unit 20. The electrode 10 may be driven through charge/discharge switches 21, 22, and 23.

FIG. 8b shows the equivalent circuit of the pressure sensor according to the second example. FIG. 8c shows a timing diagram of the signal for detecting the pressure through the equivalent circuit. Referring to FIGS. 8b and 8c, when the first switch 21 is turned on, the pressure capacitor 11 is charged to the power voltage VDD connected to an end of the first switch 21. When the third switch 23 is turned on right after the first switch 21 is turned off, electric charges charged in the pressure capacitor 11 are transferred to the amplifier 31, and the output signal Vo corresponding to the electric charges can be obtained. When the second switch 22 is turned on, all the electric charges remaining in the pressure capacitor 11 are discharged. When the third switch 23 is turned on right after the second switch 22 is turned off, the electric charges are transferred to the pressure capacitor 11 through the feedback capacitor 32, so that the output signal corresponding to the electric charges can be obtained.

Here, the output signal Vo of the circuit shown in FIG. 8b can be represented by the following equation (7).

$$v_o = -\frac{C_P}{C_{FB}} \cdot V_{DD}$$
$$v_o = -\frac{\varepsilon A}{C_{FB}} \cdot \frac{1}{d} \cdot V_{DD}$$
equation (7)

As can be seen from the equation (7), the output signal Vo is inversely proportional to the distance "d". Therefore, as shown in FIG. 8d, the output signal Vo has a characteristic that the output signal Vo is linear with respect to the distance "d". As described with reference to FIG. 7, this causes the signal processing of the pressure sensor to be complicated. Also, Also, the pressure detection performance of the above-structured pressure sensor 100 is significantly affected by the deviation of the absolute value of the pressure capacitor 11, which occurs during the manufacturing process thereof. Further, for the purpose of obtaining the output signal Vo with an appropriate magnitude, there may be, for example, a restriction that the pressure capacitor 11 should have a small value similar to that of the feedback capacitor 32 (CFB).

The pressure sensor 100 according to the embodiment of the present invention includes the first impedance 12 and the second impedance 13, so that the pressure sensor 100 can be applied without correcting the circuit even if the distance "d" between the electrode 10 and the reference potential layer 300 changes for each application to which the pressure sensor 100 is applied. This is because the sensing unit 30 of the pressure sensor 100 according to the embodiment is able to provide a signal which linearly changes according to the change amount of the distance "d". Here, both of the first impedance 12 and the second impedance 13 are composed of a capacitive component, so that the output performance irrelevant to the frequency of the drive signal can be provided.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:
1. A pressure sensor comprising:
an electrode;
a drive circuit which applies a drive signal to the electrode;
a sensing circuit which receives, from the electrode, a reception signal including information on a capacitance which is between the electrode and a reference potential layer and is changed according to a relative distance between the electrode and the reference potential layer spaced from the electrode; and
a first capacitor disposed on an electrical path between the drive circuit and the electrode such that the drive signal passes through the first capacitor, and a second capacitor disposed on an electrical path between an input terminal of the sensing circuit and the electrode such that the reception signal passes through the second capacitor, each of the first capacitor and the second capacitor has a fixed capacitance value, and a capacitance of a pressure capacitor located between the drive circuit and the sensing circuit is defined as Cp, a capacitance of the first capacitor is definded as C1 and a capacitance of the second capacitor is defined as C2, the following equation is satisfied: Cp>>C1+C2.

2. The pressure sensor of claim 1, wherein the sensing circuit outputs a signal having a linear relationship with the distance between the electrode and the reference potential layer.

3. The pressure sensor of claim 2, wherein the sensing circuit comprises:

an amplifier; and a feedback capacitor connected between a negative input terminal of the amplifier and an output terminal of the amplifier, wherein the signal having a linear relationship with the distance is an output signal of the amplifier.

4. The pressure sensor of claim 1, wherein at least one of the first capacitor and the second capacitor is integrated on a circuit where the drive circuit and the sensing circuit have been integrated.

5. The pressure sensor of claim 1, wherein the reference potential layer is a ground potential layer.

6. A touch input device comprising:

the pressure sensor according to claim 1; and the reference potential layer.

7. A pressure detector comprising:

a drive circuit which applies a drive signal to an electrode; and a sensing circuit which receives, from the electrode, a reception signal including information on a capacitance which is between the electrode and a reference potential layer and is changed according to a relative distance between the electrode and the reference potential layer spaced from the electrode, wherein the drive signal passes through a first capacitor disposed on an electrical path between the drive circuit and the electrode and then is applied to the electrode, and the reception signal passes through a second capacitor disposed on an electrical path between an input terminal of the sensing circuit and the electrode and then is received in the sensing circuit, each of the first capacitor and the second capacitor has a fixed capacitance value, and a capacitance of a pressure capacitor located between the drive circuit and the sensing circuit is defined as Cp, a capacitance of the first capacitor is defined as C1 and a capacitance of the second capacitor is defined as C2, the following equation is satisfied: Cp>>C1+C2.

8. The pressure detector of claim 7, wherein the sensing circuit outputs a signal having a linear relationship with the distance between the electrode and the reference potential layer.

9. The pressure detector of claim 8, wherein the sensing circuit comprises:

an amplifier; and a feedback capacitor connected between a negative input terminal of the amplifier and an output terminal of the amplifier, wherein the signal having a linear relationship with the distance is an output signal of the amplifier.

10. The pressure detector of claim 7, wherein at least one of the first capacitor and the second capacitor is integrated on a circuit where the drive circuit and the sensing circuit have been integrated.

11. The pressure detector of claim 7, wherein the reference potential layer is a ground potential layer.

12. The pressure detector of claim 7, wherein the first capacitor and the second capacitor are configured such that an output signal of the sensing circuit changes linearly in proportion of the distance between the electrode and the reference potential layer.

13. The pressure sensor of claim 1, wherein the first capacitor and the second capacitor are configured such that an output signal of the sensing circuit changes linearly in proportion of the distance between the electrode and the reference potential layer.

14. The pressure sensor of claim 1, wherein each of the first capacitor and the second capacitor is a non-parasitic capacitor.

15. The pressure detector of claim 7, wherein each of the first capacitor and the second capacitor is a non-parasitic capacitor.

* * * * *